No. 750,123. PATENTED JAN. 19, 1904.
E. K. REA.
NOSE RING FOR ANIMALS.
APPLICATION FILED AUG. 31, 1903.
NO MODEL.

Witnesses:
W. H. Cotton.
E. W. Klatcher

Inventor:
Edmund K. Rea.
By Louis K. Gieseger
Atty.

No. 750,123. Patented January 19, 1904.

UNITED STATES PATENT OFFICE.

EDMUND K. REA, OF OVID, MISSOURI.

NOSE-RING FOR ANIMALS.

SPECIFICATION forming part of Letters Patent No. 750,123, dated January 19, 1904.

Application filed August 31, 1903. Serial No. 171,419. (No model.)

*To all whom it may concern:*

Be it known that I, EDMUND K. REA, a citizen of the United States, and a resident of Ovid, county of Ray, and State of Missouri, have invented certain new and useful Improvements in Nose-Rings for Animals, of which the following is a specification and which are illustrated in the accompanying drawings, forming a part thereof.

This invention relates to that class of nose-rings which are self-piercing, being adapted to perforate the cartilage of the animal's nose without necessitating the use of a separate appliance for first forming an aperture in the cartilage.

The object of the invention is to simplify, cheapen, and strengthen the construction of this class of devices; and it consists of a two-part or hinged ring having the outer ends of its members obliquely scarfed, so as to overlap.

The invention is illustrated in the accompanying drawings, in which—

Figure 1:
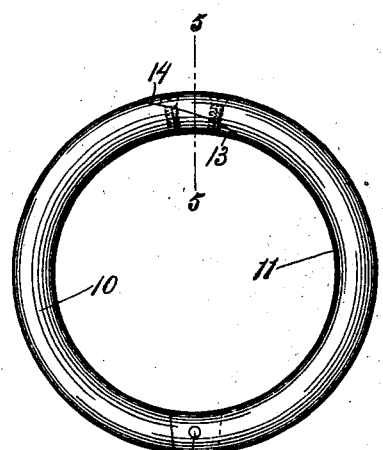
Figure 3:
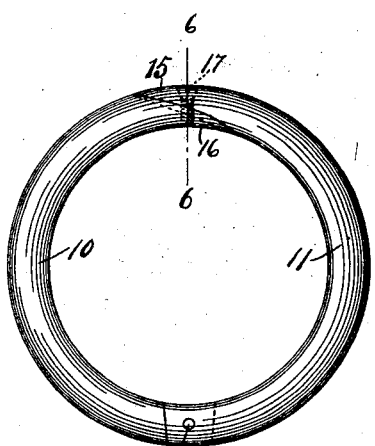
Figure 5:
Figure 6:
Figure 2:
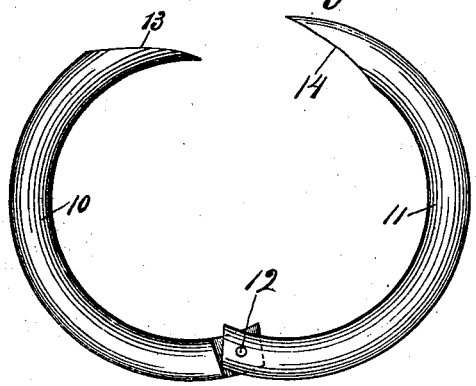
Figure 4:
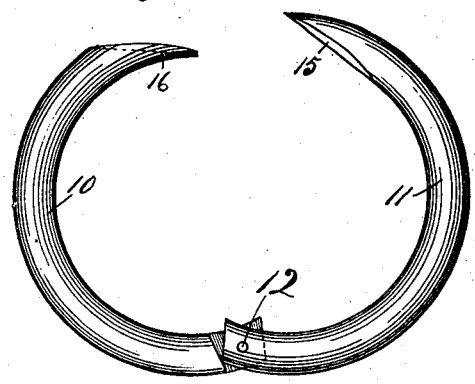
Figure 7:
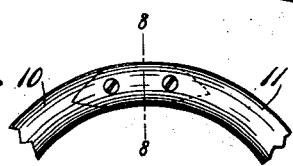
Figure 8:

Figure 1 is a plan view of one form of the ring. Fig. 2 is a plan view of the same form of ring when open. Fig. 3 is a plan view of a modified form of the ring when closed. Fig. 4 is a similar view of the same form of ring when open. Fig. 5 is a transverse section on the line 5 5 of Fig. 1. Fig. 6 is a transverse section on the line 6 6 of Fig. 3, and Figs. 7 and 8 show a modified form of construction.

The ring consists of two semicircular members 10 11, hinged together at 12 and having their outer ends—that is to say, the ends remote from the hinge—obliquely scarfed, as shown at 13 14, so as to overlap. These scarfed faces may be flat, as shown in Fig. 5, or they may be transversely curved, as shown in Fig. 6, the one, 15, being convex and the other, 16, being concave, so that they will fit together, or they may be in any shape that will leave a sharp point or cutting edge to one or both of the ends.

One of the scarfed ends, preferably the outer lap 13 or 14, is brought to a sharp edge at its tip, so that it may be used for puncturing the cartilage of an animal's nose. I prefer the form shown in Figs. 3, 4, and 6 as providing a somewhat more satisfactory piercing-tip and a somewhat better joint when the ring is closed than the forms shown in Figs. 1, 2, and 5.

The ring is provided with one or more apertures extending through the overlapping or scarfed ends and threaded to receive a screw, as 17, by which it may be secured in its closed position. This ring is not only more easily and cheaply made than self-piercing nose-rings heretofore used, but the oblique disposition of the scarfed faces of the overlapping portions provides stock adjacent to the extreme top, through which the retaining-screw may be passed, thus preventing the tip from being forced outwardly by any distortion of the ring to oval form. In order to more effectually provide against this raising of the tip, I prefer to use two screws, as shown in Fig. 1.

A modified form of construction is shown in Figs. 7 and 8, in which the plane of the scarfing of the ends of the members 10 and 11 is approximately parallel with the radius of the ring instead of its axis, as shown in the other figures.

I claim as my invention—

1. A nose-ring consisting of two hinged sections, the free ends of which are obliquely scarfed to overlap each other, their scarfed faces being free from surface projections.

2. A nose-ring consisting of two hinged sections, the free ends of which are obliquely scarfed to overlap each other, one of said ends having a sharp point or cutting edge, and both being free from surface projections.

3. A nose-ring consisting of two hinged sections, the free ends of which are obliquely scarfed to overlap each other, their meeting faces being without projections, one of said ends having a sharp point or cutting edge, and said ends being secured by a screw.

4. A nose-ring for animals comprising two curved members hinged together and having their free ends obliquely scarfed and complementary to each other, their meeting faces being free from surface projections.

5. A nose-ring for animals comprising two curved members hinged together and having their free ends obliquely scarfed, one of the scarfed faces being convex and the other being concave, and both being free from surface projections.

EDMUND K. REA.

Witnesses:
F. E. CRAIG,
D. A. MICHAEL.